May 26, 1936.  P. A. BAUMEISTER ET AL  2,041,690
PNEUMATIC DRILL
Filed Jan. 13, 1934
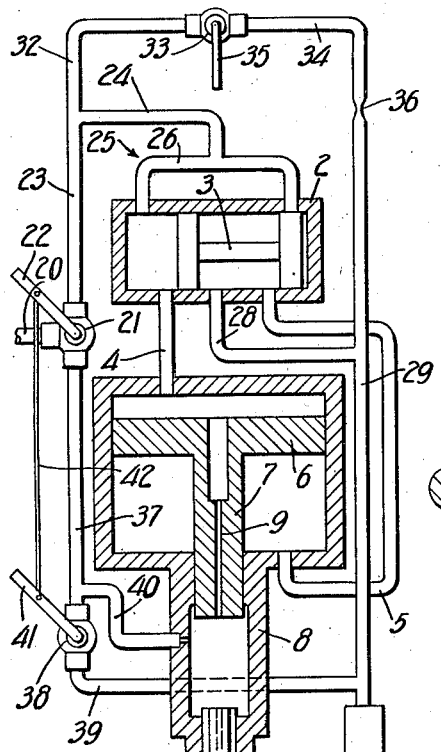
Fig. 1.
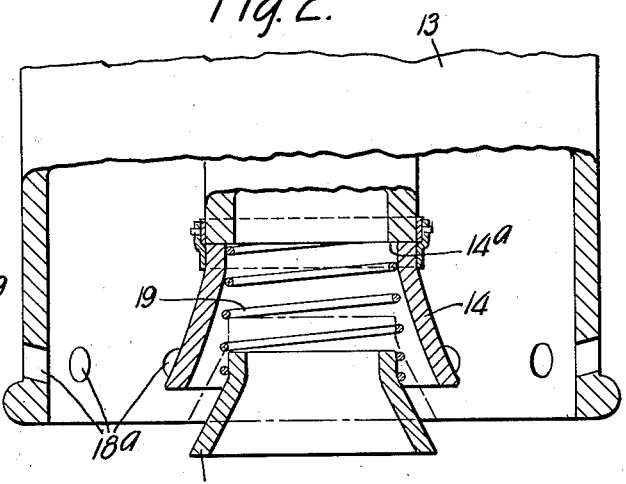
Fig. 2.
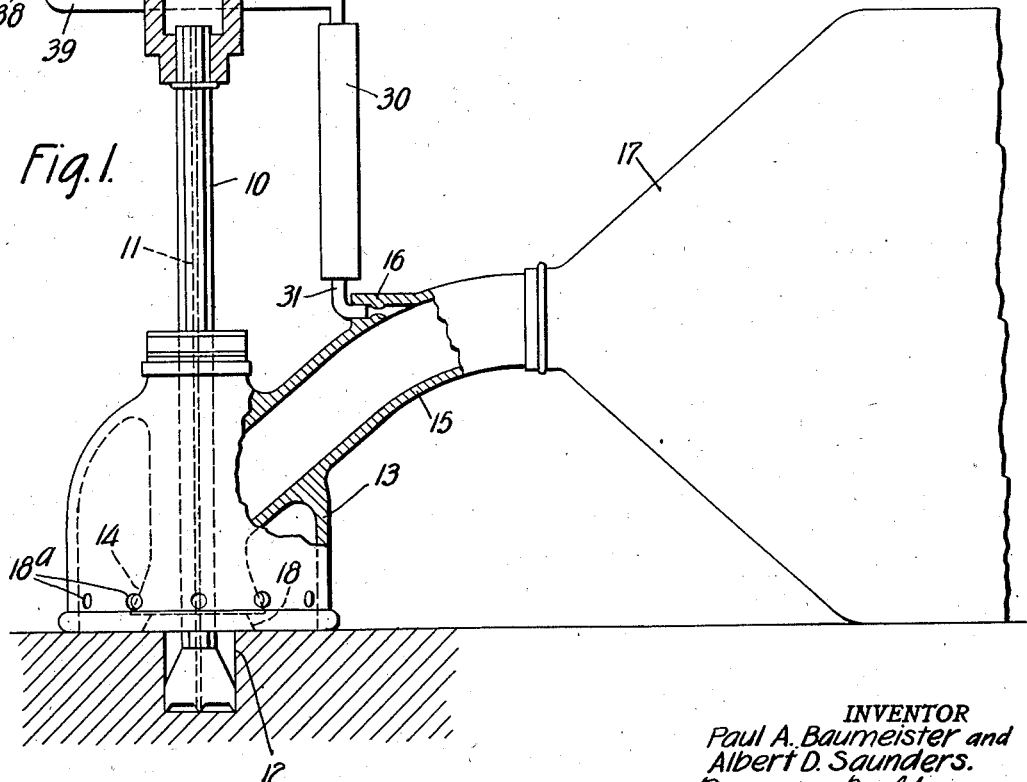
INVENTOR
Paul A. Baumeister and
Albert D. Saunders.
BY Moses & Nolte
ATTORNEYS Patented May 26, 1936

2,041,690

UNITED STATES PATENT OFFICE 2,041,690

PNEUMATIC DRILL

Paul A. Baumeister, Flushing, and Albert D. Saunders, Great Neck, N. Y., assignors to The Arthur A. Johnson Corporation, Long Island City, N. Y., a corporation of New York Application January 13, 1934, Serial No. 706,478

9 Claims. (Cl. 255—50)

This invention relates to pneumatic drills and has for an object to provide improved mechanism for blowing out the hole formed in the work by the drill bit and for conducting away the dust and chips formed by the drilling. The invention is in the nature of an improvement on the invention disclosed in our pending application Serial No. 679,020, filed July 5, 1933, for Dust removers for drills and the like.

It is an object of the invention to provide a pneumatic drill having means normally effective during the operation of the drill for supplying air by leakage from the drill motor to continually blow out the hole together with suction means continuously operated by exhaust air from the drill motor to carry away the dust, in combination with means for simultaneously causing live air to be supplied for blowing out the hole and for operating the suction means when the drill motor is idle. The arrangement is desirably such that the motor must be stopped before connections can be established for using live air to blow out the hole and to operate the suction means.

It is a further feature of the invention that provision is made for enabling some live air to be used at the discretion of the operator for assisting in the operation of the suction means while the drill is in operation, but that provision is made for automatically and positively limiting the amount of live air which can be so used.

In accordance with a further feature of the invention, a suction nozzle which surrounds the drill bit is provided with a spring supported mouthpiece which is adapted to be thrust against the work and held against the work under spring pressure.

In accordance with a further feature of the invention, a hood which surrounds the suction nozzle and which is adapted to engage the work for spacing the nozzle from the work is provided with a series of openings which extend a sufficient distance above the work engaging end of the hood to avoid liability of their becoming clogged or obstructed by mud or water. It is feasible to provide the openings at any convenient height above the lower end of the hood since the air entering the hood must all pass down into close proximity to the work in order to escape through the suction nozzle.

Other objects and advantages will hereinafter appear.

In the drawing illustrating one form of embodiment of the invention and forming part of this specification, Figure 1 is a view in elevation, partly broken away, illustrating a drill embodying features of the invention, the view being somewhat diagrammatic in that certain usual and conventional parts are omitted; and Figure 2 is a fragmentary detail view, partly broken away, illustrating the lower end of the hood and the suction nozzle.

The illustrative drill comprises a motor cylinder 1 and a valve cylinder 2. A piston valve 3 is reciprocated in the valve cylinder 2 by any suitable mechanism of usual construction (not shown), for controlling the delivery of air alternately to opposite ends of the motor cylinder 1. A conduit 4 connects one end of the valve cylinder with the upper end of the motor cylinder, and a conduit 5 connects the opposite end of the valve cylinder with the lower end of the motor cylinder. Within the motor cylinder 1, provision is made of a reciprocable piston 6 having a stem 7. The stem 7 is long enough so that its lower end always extends well down below the operating chamber of the piston into a lower extension 8 of the motor cylinder. The stem 7 has a restricted passage 9 extending axially therethrough for delivering air into the chamber 8. The stem 7 is designed to strike the upper end of a drill bit 10 in the usual manner for driving it into the work. A passage 11 extends through the drill bit 10 from the chamber 8 to the lower end of the bit, and air which escapes through the leakage passage 9 is conducted down through the bit into the bottom of the hole 12 which is being drilled in the work, and serves continually to blow out the hole.

A hood 13 surrounds the drill bit. The lower extremity of the hood is formed to engage the work in a single plane and to provide a stable work engaging base. Fixed to the hood, or integral therewith, is a suction nozzle 14 which communicates with a suction duct 15. Suction is produced in the duct 15 by means of an ejector 16, and the material caused to travel through the duct 15 is accumulated in a porous receptacle 17. The nozzle is normally spaced from the work by engagement of the hood with the work.

A hood of the kind shown has been found to be preferable for most purposes. Such a hood being continuous at its lower edge affords an infinite number of possible work contacting points, so that a stable base, disposed in the proper plane with relation to the work for properly spacing the nozzle from the work, is assured. The continuous hood, moreover, may have adequate strength if made of a light and somewhat flexible material such as rubber. This is desirable both from the standpoint of lightness and from the standpoint of avoiding damage in case the hood is struck by heavy rock or other material. The continuous hood as shown serves further to cause the incoming air to flow with substantial velocity in contact with the surface of the work before entering the nozzle, and hence prevents any possible accumulation of dust and chips on the surface of the work around the drill hole. For some classes of work, however, it may be preferable to employ a skeletonized hood or a mere series of legs, such as a tripod, to form a stable nozzle spacing means, in which case the skeletonized hood or tripod is desirably made of metal.

The hood 13 has a series of openings 18 formed in it which extend a substantial distance above the base for admitting air to the hood. The location of the openings above the base of the hood is feasible because of the fact that the suction nozzle extends well down into the hood toward the work and causes all air entering the hood to escape through the nozzle in an upwardly travelling stream. It is advantageous to locate the openings above the base of the hood to avoid their being clogged and obstructed by mud or water.

The nozzle 14 is flared at the lower end thereof and carries an inner mouthpiece 18 which is also flared at the lower end. The mouthpiece 18 is fixed to one end of a coil spring 19, said spring being fixed at the opposite end thereof to a portion of the nozzle 14. The mouthpiece 18 is normally projected beyond the base of the hood 13, but when placed against the work it acts to compress the spring 19 so that it does not materially interfere with the placing of the hood in contact with the work. The mouthpiece 18 in conjunction with the nozzle 14 defines an annular space through which air from the hood enters the nozzle. The air thus entering the hood is controlled in direction and velocity to cause it to act efficiently to carry away the dust and chips. The base of the mouthpiece 18 desirably terminates in a single plane and is adapted to bear continuously against the work when the work presents a flat surface.

The upper end of the mouthpiece 18 extends into the nozzle 14 in spaced relation thereto and in effect extends the actual exit of the drill hole 12 into the nozzle 14 to deliver the dust and chips into the stream of atmospheric air drawn into the nozzle 14 by the ejector 16.

This function is of particular importance when the hole is first being started because at that time the air jet issuing from the hollow drill is not guided upward as it is after the hole has been drilled to some depth. The air jet simply tends to blow outward in all directions and to scatter the dust and chips. The mouthpiece, however, serves to confine the air from the jet together with the dust and chips and to cause them to travel upward into the nozzle.

The spring 19 forms a universal, yieldable support for the mouthpiece 18, and consequently causes the mouthpiece to hug the work as closely as it can even though the hole is being drilled at an oblique angle to the face of the work. Lateral displacement of the mouthpiece 18 relative to the nozzle 14 does not affect the velocity of the incoming stream of air substantially since the flow area between the mouthpiece and the nozzle is not altered by such lateral displacement. Tilting of the mouthpiece relative to the nozzle has but slight effect upon the velocity of the air stream.

It is a feature that the spring 19 lies outside the path of the air jet issuing from the drill hole 12. The mouthpiece is tapered sufficiently to enable the spring to extend outside the upper end of the mouthpiece, and the internal area of the nozzle is made sufficiently large to enable the spring to be received within it without being disposed in the stream of dust and chips. To this end it is a point that the nozzle is provided with an internal shoulder 14a which is desirably at least as broad as the thickness of the spring wire. This arrangement serves both to avoid abrasion of the spring and to avoid obstructing the dust and chips.

Compressed air is supplied to the drill from a conduit 20, through a valve 21 which has a right angle passage provided therethrough. When the valve handle 22 is in the position illustrated in Figure 1, the air is delivered from the conduit 20 into a conduit 23, and thence through a conduit 24 to a conduit 25 having branches 26 and 27 which communicate respectively with opposite ends of the control valve cylinder 2. When the valve is in the position illustrated in Figure 1, the air is delivered into the left end of the valve cylinder and passes thence through the conduit 4 into the upper end of the motor cylinder 1. A portion of this air leaks out through the passage 9 and the hollow drill 10 to blow out the hole in the work as already described.

The valve 3, which comprises a pair of spaced piston heads, travels toward the left from the position of Figure 1. At the same time the conduit 5 which communicates with the lower chamber of the motor cylinder is placed by the valve 3 in communication with the space between the piston heads of the valve. This space communicates constantly through a conduit 28 with an exhaust conduit 29. The exhaust conduit 29 communicates through an expansible and contractible telescopic device 30 (as disclosed in our pending application previously referred to) with a conduit 31 which delivers the air to the ejector 16.

In the continued operation of the drill motor, the valve 3 travels to the left causing the conduit 27 to be placed in communication with the conduit 5 and the conduit 4 to be placed in communication with the conduit 28. This causes compressed air to be delivered to the lower chamber of the motor cylinder 1 and exhaust air to be discharged through conduit 4, valve cylinder 2 and conduit 28 to the conduit 29. When the valve reaches the left-hand limit of movement it returns toward the right to re-establish the original connections. This cycle of operations is continued so long as the drilling is in progress.

It is desirable in some instances for the operator to have the option of utilizing a small quantity of live air (as distinguished from exhaust air) for the operation of the ejector 16. The conduit 23 is accordingly connected through a conduit 32, valve 33 and conduit 34 with the conduit 29. When the valve 33 is in the position illustrated in Figure 1, it is closed. The operator may open the valve to any extent desired by operation of the valve handle 35. In order to prevent the delivery of more than a small quantity of air through this channel of communication, the conduit 34 is provided with a constriction 36. The construction prevents the production of objectionable back pressure upon the drill motor and avoids the wasting of live air.

From time to time it is desirable to shut off the drill and to use live air for blowing out the hole while at the same time using live air for the operation of the ejector so that a simultaneous suction effect is produced. To this end a conduit 37 is provided which communicates through a valve 38 with a conduit 39. The conduit 37 communicates directly through a conduit 40 with the cylinder extension 8, and, through valve 38 and conduit 39, with the conduit 29. The valve 38 may be in the form of a cylinder or cone having a diametrical passage through it and serves during operation of the motor to prevent diversion of air from the cylinder extension 8 to conduits 39 and 29. In the position illustrated in Figure 1 the valve 38 is closed. The handle 41 of the valve 38 is connected by any suitable means, such as a link 42, with the handle 22 of the valve 21. The handles 22 and 41 are thus caused to move in unison. When the handle 22 is depressed to a horizontal position the pipe 20 is cut off from communication with both the conduits 23 and 37 so that the motor is stopped and no air is delivered to any part of the mechanism. When the handle is further depressed to a position displaced 90° from that illustrated in Figure 1, the conduit 20 is placed in communication with the conduit 37, and the conduit 37 is placed in communication with the conduit 39. Live air is then discharged through the drill bit 10 and through the ejector 16 so that the hole is thoroughly blown out and the dust and chips are carried away by suction. As soon as the valve handle 22 is returned to the position illustrated in Figure 1, the normal operation of the drill motor is resumed and at the same time the air connections are restored to the condition for causing the hole to be blown out by air leaking from the upper chamber of the motor cylinder and the ejector to be operated from the motor exhaust.

While we have illustrated and described in detail certain preferred forms of our invention, it is to be understood that changes may be made therein and the invention embodied in other structures. We do not, therefore, desire to limit ourselves to the specific construction illustrated, but intend to cover our invention broadly in whatever form its principle may be utilized.

We claim:

1. In a pneumatic drill, in combination, a hollow drill bit, a drill motor, a suction device, means effective during normal operation of the motor for causing compressed air to be supplied through the bit for blowing out the hole in the work and for utilizing exhaust air from the motor to operate the suction device for conducting away dust and chips, and means operable when the motor is idle to supply air through the bit for blowing out the hole and for supplying air to operate the suction device.

2. In a pneumatic drill, in combination, a hollow drill bit, a drill motor, a suction device, means effective during normal operation of the motor for causing a portion of the compressed air delivered to the motor to be supplied through the bit for blowing out the hole in the work and for utilizing exhaust air from the motor to operate the suction device for conducting away dust and chips, and a control member operable to shut off the motor and to cause live air to be delivered directly through the drill bit and the suction device.

3. In a pneumatic drill, in combination, a hollow drill bit, a drill motor, a suction device, means effective during normal operation of the motor for causing a quantity of the compressed air delivered to the motor to be supplied through the bit for blowing out the hole in the work and for utilizing exhaust air from the motor to operate the suction device for conducting away the dust and chips, and a control member operable to shut off the motor and effective by a further operation to supply live air simultaneously to the drill bit and to the suction device.

4. In a pneumatic drill, in combination, a drill bit, a drill motor, a suction device, means controlling the supply of air to the motor, means conducting the exhaust air from the motor to the suction device to operate the same, a by-pass around the motor for delivering compressed air to the suction device, a manually operable valve for controlling said by-pass, and a constriction in the by-pass for preventing the delivery of an objectionably large quantity of air through the by-pass.

5. In a pneumatic drill, in combination, a hollow drill bit, a drill motor, a suction device, means effective during operation of the motor for causing a portion of the air delivered to the motor to be supplied through the bit for blowing out the hole in the work and for utilizing exhaust air from the motor to operate the suction device for conducting away dust and chips, a valve for controlling the supply of air to the motor, a conduit also controlled by said valve to which air may be delivered by operation of the valve when the motor is idle, said conduit being in communication with the drill bit, a second valve in said conduit, connections from the second valve to the suction device, said second valve being effective when the motor is in operation to prevent the diversion to the suction device of air intended for the drill bit, and means interconnecting the valves to cause the second valve to be opened as an incident of the operation of the first valve to deliver air into the said conduit.

6. In a pneumatic drill, in combination, a drill bit, a suction nozzle surrounding the drill bit, a mouthpiece for said nozzle extending from within the nozzle to a point beyond the extremity thereof and defining an air intake passage around the mouthpiece at the mouth of the nozzle, and a spring yieldingly supporting the mouthpiece from the nozzle in spaced relation thereto.

7. In a pneumatic drill, in combination, a drill bit, a suction nozzle surrounding the drill bit, a hood surrounding the nozzle in fixed relation thereto and terminating beyond the intake end of the nozzle, a mouthpiece carried by the nozzle in the intake end thereof and defining between itself and the nozzle an air admission space to the nozzle at the intake end thereof, and a spring holding the mouth piece partially projected beyond the intake end of the nozzle and normally beyond the extremity of the hood but yieldable to permit the mouthpiece to retreat relative to the hood and nozzle so that the hood can be pressed into engagement with the work after the mouthpiece has engaged the work.

8. In a pneumatic drill, in combination, a drill bit, a suction nozzle surrounding the drill bit, means outside the nozzle for engaging the work and maintaining the nozzle out of contact with the work, a work engaging mouthpiece for the nozzle and a spring universally supporting the mouthpiece from the nozzle in spaced relation thereto.

9. In a pneumatic drill, in combination, a drill bit, a suction nozzle surrounding the drill bit, means outside the nozzle for engaging the work and maintaining the nozzle out of contact with the work, a work engaging mouthpiece for the nozzle and a spring supporting the mouthpiece from the nozzle, said mouthpiece being disposed within the nozzle and being spaced therefrom so that an air admission space is provided between the end of the nozzle and the mouthpiece.

PAUL A. BAUMEISTER.
ALBERT D. SAUNDERS.